United States Patent [19]
Czerwiec

[11] Patent Number: 5,283,678
[45] Date of Patent: Feb. 1, 1994

[54] METALLIC ACCESS IN A FIBER REMOTE TERMINAL

[75] Inventor: Richard M. Czerwiec, Raleigh, N.C.

[73] Assignee: Alcatel Network Systems, Inc., Richardson, Tex.

[21] Appl. No.: 853,532

[22] Filed: Mar. 18, 1992

[51] Int. Cl.⁵ .............................. H04B 10/00
[52] U.S. Cl. .................... 359/109; 359/163; 359/174; 370/67
[58] Field of Search ............... 359/109, 117, 118, 163, 359/174; 370/60, 60.1, 67

[56] References Cited

U.S. PATENT DOCUMENTS

| | | | |
|---|---|---|---|
| 4,870,637 | 9/1989 | Follett et al. | 359/163 |
| 4,912,521 | 3/1990 | Almquist et al. | 359/152 |
| 4,993,019 | 2/1991 | Cole et al. | 370/67 |
| 5,134,508 | 7/1992 | Corda | 359/109 |
| 5,191,456 | 3/1993 | Sutherland et al. | 359/118 |

Primary Examiner—Herbert Goldstein
Assistant Examiner—K. Negash
Attorney, Agent, or Firm—Ware, Fressola, Van Der Sluys & Adolphson

[57] ABSTRACT

An optical line shelf formerly used exclusively for multiplexing broadband video with voice channels in a serial bus transport format is adapted for use with both optical line distribution units and a metallic distribution unit.

3 Claims, 8 Drawing Sheets

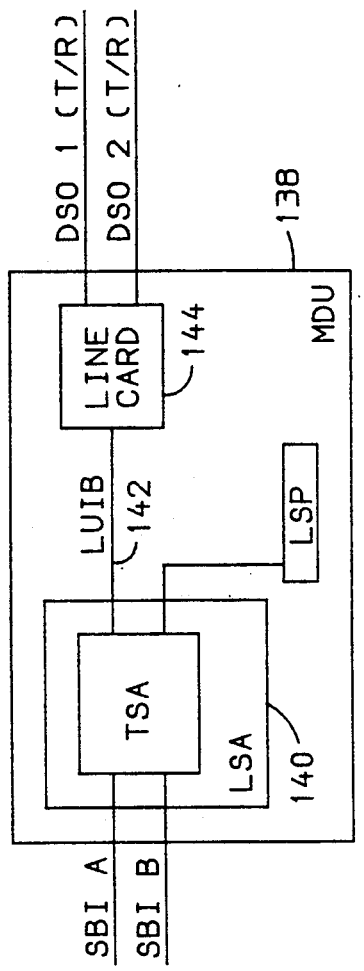
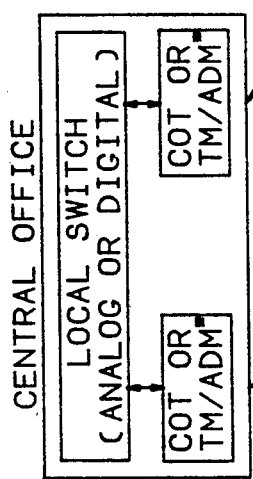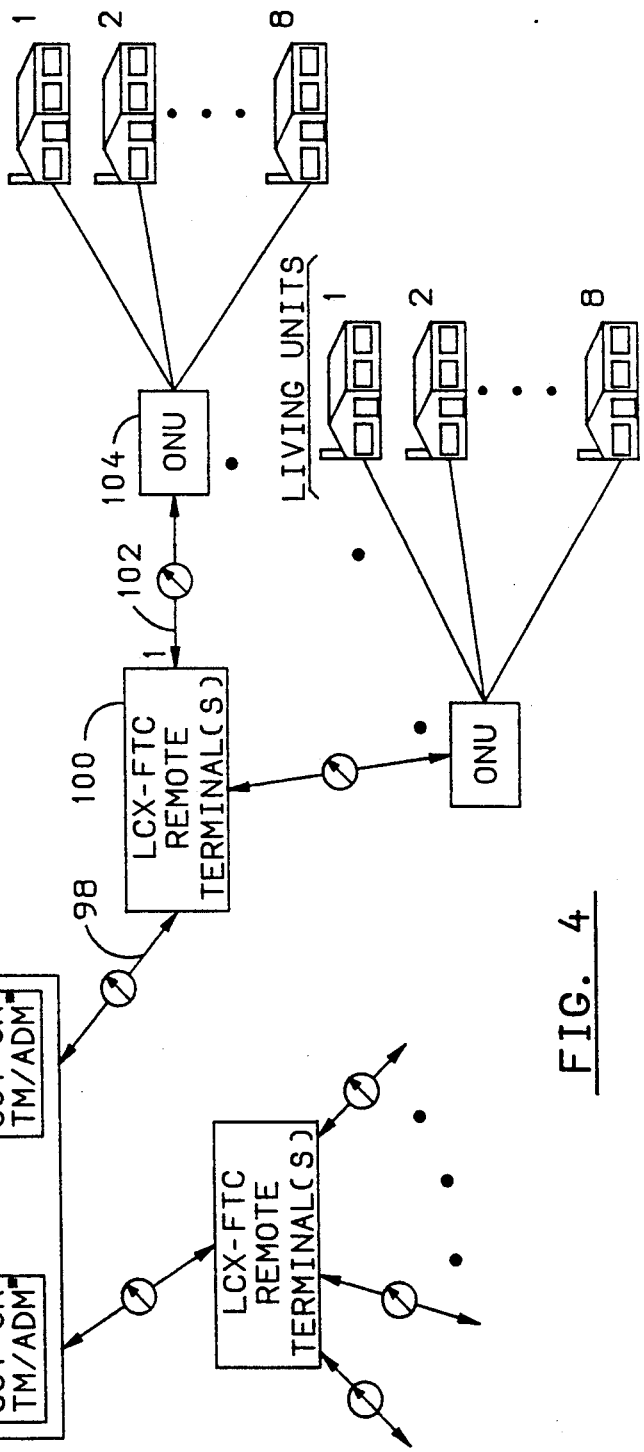

5,283,678

METALLIC ACCESS IN A FIBER REMOTE TERMINAL

TECHNICAL FIELD

This invention relates to telecommunications and, more particularly, to the distribution of telecommunication services.

BACKGROUND OF THE INVENTION

In co-pending application Ser. No. 07/452,291 now U.S. Pat. No. 5,161,152 entitled "High Speed Synchronous Transmission Line Access Terminal," now U.S. Pat. No. 5,161,152 there is shown a structural configuration of a line shelf which is constructed with a back plane connector array and slots for receiving various plug-in units. The line shelf includes redundant power supplies, line shelf processors, line shelf access units and test access units for remote terminal applications and a channel test unit in lieu of the test access units if the line shelf is used at a central office terminal A total of forty-eight line units are provided in four groups of twelve each.

In order to expand the functionality of the above line shelf to include a fiber-to-the-curb (FTC) application, a new shelf called the optical distribution shelf (ODS) has been developed and is the subject of a separate co-pending patent application entitled "Optical Distribution Shelf for a Remote Terminal of an Optical Fiber Telecommunications Network" being filed under U.S. Ser. No. 07/738,315.

A problem found in developing the FTC product, with only fiber distribution in the remote housing, is that there is no access provided for metallic voice frequency (VF) services at the housing, yet these services are required for craft communications as well as existing line testing architectures.

DISCLOSURE OF INVENTION

The object of the present invention is to provide metallic access at an optical distribution shelf.

According to the present invention, a metallic distribution unit (MDU) is substituted for one of a plurality of optical distribution units (ODU) in an optical distribution shelf.

In further accord with the present invention, the MDU is I/O compatible with the ODU and generally will be installed in the first ODU slot of the first optical distribution shelf in a completely fiber remote housing. In the above cited co-pending application Ser. No. 07/738,315 a remote terminal is shown having a plurality of optical distribution shelves each of which is responsive to a plurality of serial bus interface signals. Each serial bus interface signal has a format as described in U.S. Pat. No. 5,060,229 and carries a plurality of DS0 level signals, e.g., twenty-four DS0s (for an equivalent of one DS1) plus eight overhead channels to make one SBI level signal. Twenty-eight DS1s make an OC-1. Each optical distribution shelf within a remote terminal site may be responsive, for example, to twenty-eight SBI signals which may be combined into a single optical signal for transmission to an optical network unit in a subscriber's neighborhood. Each ONU may serve a plurality of subscriber homes with metallic signal connections to the homes.

In still further accord of the present invention, the MDU is I/O compatible with the ODU, except that there will be no provision for an optical connector or coaxial connector. In order to have metallic access, i.e., at least two DS0s, the architecture shown in U.S. Pat. No. 5,161,152 i.e., of providing two SBIs (A and B sides) to an ODU slot will be utilized. However, instead of selecting the A/B side and passing the SBI over fiber to the extended line shelf at the ONU (as the ODU does), the SBI will be terminated at the MDU, where a subset of the current LSP, LSA and line card functions (as in U.S. Pat. No. 5,161,152 will exist. It should be noted that an entire SBI is dedicated to this MDU function, yielding at least two DS0s (out of 24 available), and also allowing access to SBI overhead channels such as the VI channel for LSP to DNC communications.

In further accord with the present invention, in addition to the SBI to DS0 conversion for metallic access, the MDU may provide alarm/status and inventory information as per the scheme disclosed in co-pending applications Ser. No. 07/844,134, entitled "Inventory Retrieval" and Ser. No. 07/844,244, entitled "Alarm Collection Method and Apparatus."

The metallic access paths of the present invention can be used for several purposes. DS0s must be provided for (1) the analog modem link to the remote test unit residing in the remote housing (given the present MLT line test architecture), and (2) an order wire function at the remote housing. The order wire gives a tip/ring access at the fuse panel, allowing a craft person to place telephone calls with his "butt set", providing normal telephone operation from a dedicated telephone number. Any DS0s going outside the RT housing will have their tips/rings protected against lightning/power cross and, if provided, can permit normal customer drops for telephony service to a subscriber within a CSA area.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 4 is a block diagram of a basic narrow band FTC architecture which can be upgraded to provide broadband service.

FIG. 8 is a block diagram showing a metallic distribution unit for use in the optical distribution shelf of FIG. 7, for example, in the slot normally occupied by ODU1.

BEST MODE FOR CARRYING OUT THE INVENTION

Figure 1:
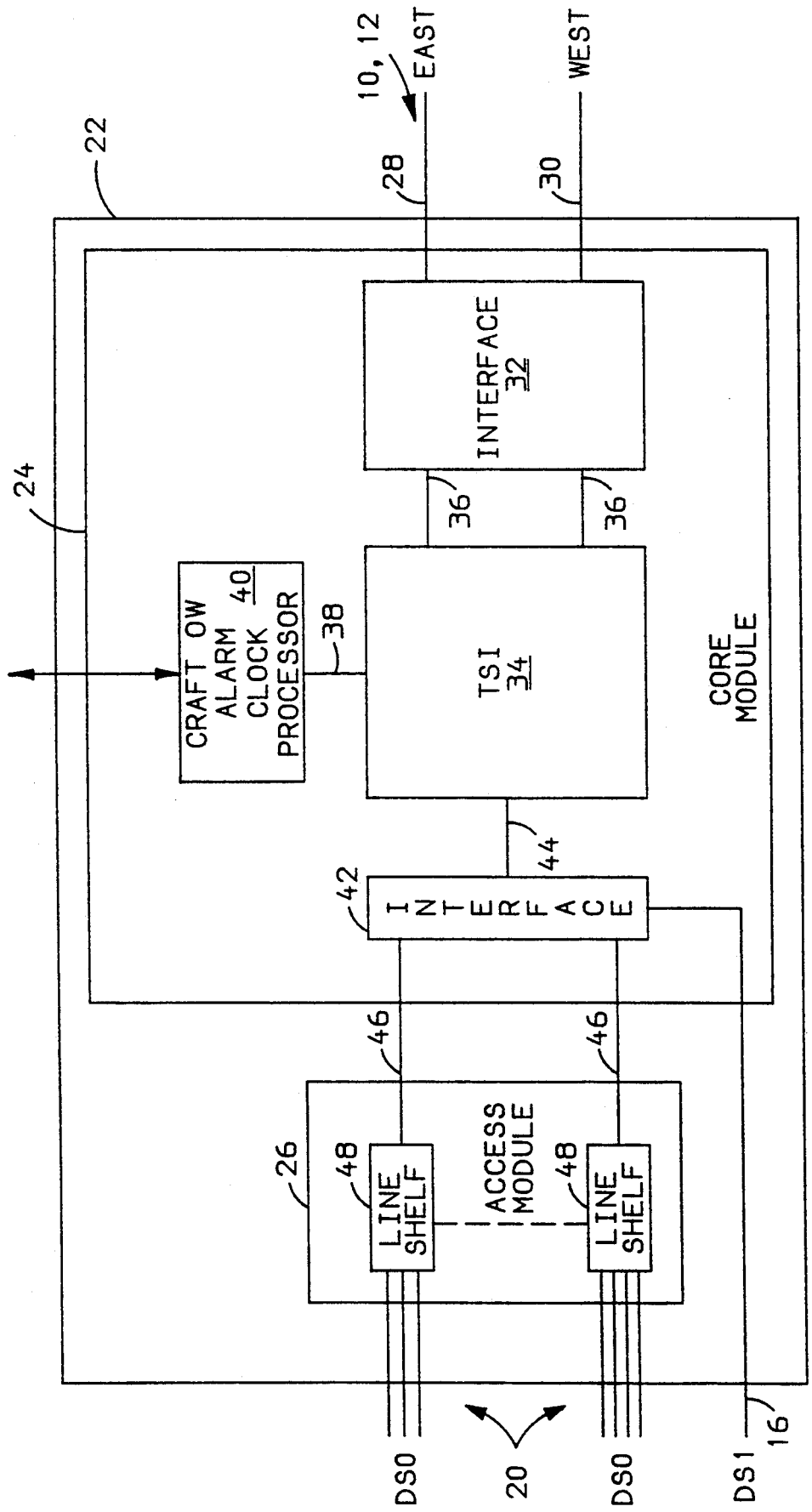
FIG. 1 is a block diagram of an access terminal.

FIG. 1 shows a block diagram of an access terminal as disclosed in co-pending patent application Ser. No. 07/452,291 entitled "High Speed Synchronous Transmission Line Access Terminal" which is hereby incorporated by reference. That disclosure provides direct access for residential and business subscribers to high-speed synchronous digital fiber optic broadband feeder facilities, or to a DS1 level T1 metallic feeder plant. Further disclosed therein is a network element with reduced overhead equipment through the use of a single core module for serving the needs of a plurality of line shelves. The access terminal 22 of FIG. 1 has a core module 24 connected to high-speed feeder lines 10, 12, which may be either an OC1 optical transmission line or an STS1 electrical transmission line. The feeder line includes a line 28 connected in the east direction and a line 30 connected in the west direction. The lines are connected to a feeder interface 32 which is further connected to a timeslot interchanger 34 through parallel buses 36. The timeslot interchanger 34 is connected via buses 38 to control an interface circuitry 40, which includes a control processor, clock circuits, a craft interface, order wire and alarm interfaces. The timeslot interchanger 34 is further connected to interface circuitry 42 via serial buses 44. Interface 42 provides DS1 outputs to transmission line 16 and further has outputs connected via serial buses 46 to the access module 26 which includes a plurality of line shelves 48, each of which is connected to a plurality of DS0 subscriber lines 20.

The core module 24 may be constructed in a manner substantially similar to an add/drop multiplexer shown and described in U.S. Pat. No. 5,060,229 or as shown and described in FIG. 3 of U.S. patent application Ser. No. 07/452,291.

Figure 2:
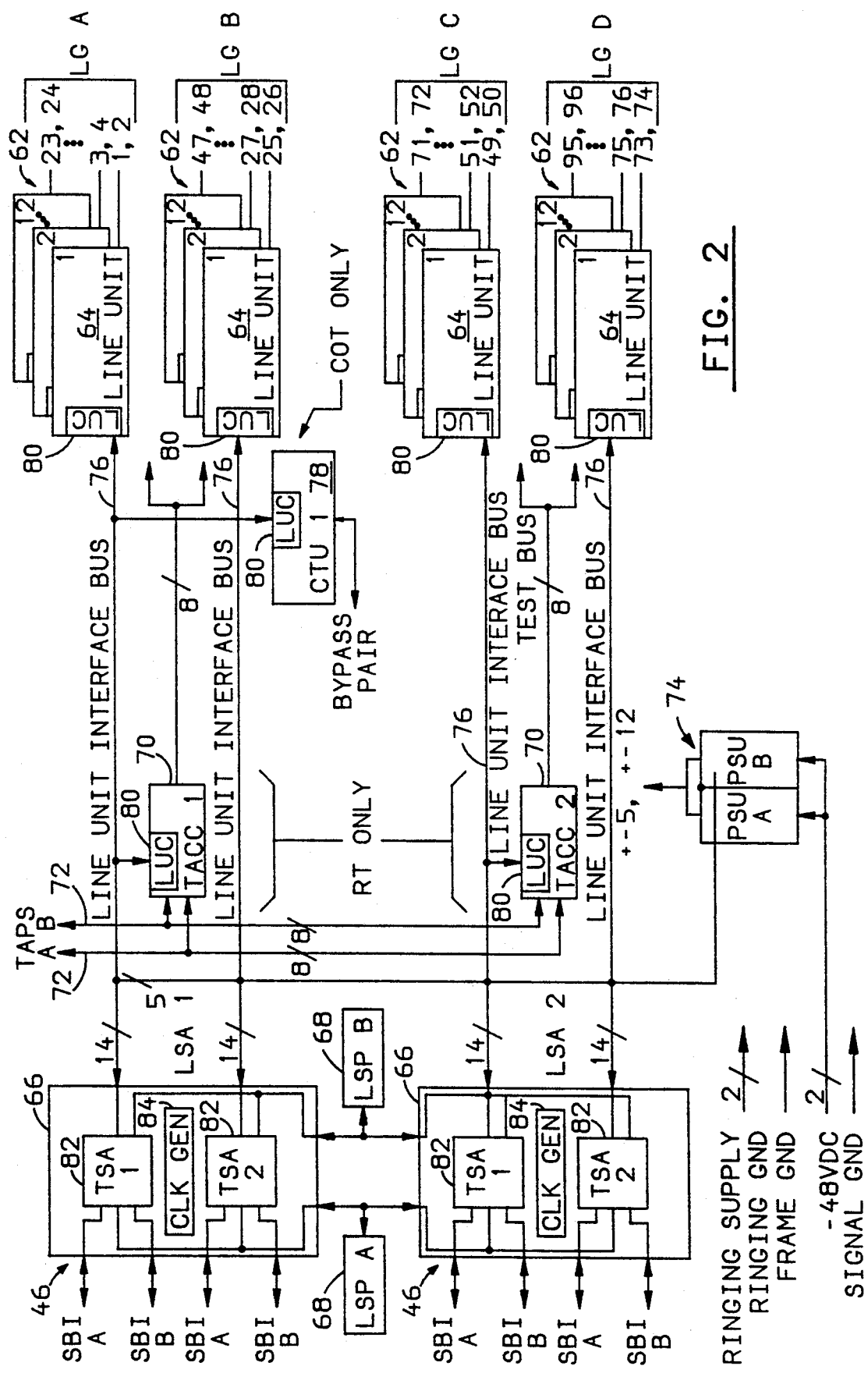
FIG. 2 is a block diagram of a metallic line shelf.

Referring now to FIG. 2, there is shown a block diagram of a metallic line shelf 48 as used in the access module 26 of the above mentioned co-pending application Ser. No. 07/452,291. Each line shelf is arranged in four groups 62 of subscriber line outputs at the DS0 level, as shown in a line shelf 48 in FIG. 3. Each of the groups includes twelve line units 64, most units being capable of handling one or two subscriber lines so that a maximum total of ninety-six subscriber lines may be handled by a line shelf. A pair of line shelf access units 66 are arranged to each service two of the groups 62 of subscriber lines and function to multiplex the DS0 channels of these groups to a pair of redundant serial buses 46. Two line shelf processors 68 are provided to control the line shelf access units 66, with each processor having sufficient capacity to control the entire line shelf in the event of failure of the other processor. Thus, in normal operation, both processors work at less than full capacity. In the event of a failure, one processor can service the line shelf with only slightly degraded service.

Each of the two test access units 70 provide full test-end, test-out capability for monitor and split-test access for two of the groups 62 of subscriber lines. Each test access unit 70 provides test access to either of two test access paths 72. One test access path is a 2-wire test access path for 2-wire circuits, and the other test access path is a 6-wire test access path for 2-, 4- or 6- wire circuits. The test access units also monitor talk battery and ring voltage presence and reports to processor.

A pair of power supply units 74 are also provided, one being redundant.

One channel test unit 78, which is only required in one central office terminal line shelf of a 672 line system, provides an interface between the digital loop carrier and a pair gain test controller (PGTC). The channel test unit 78 provides test trunk access to a by-pass pair for testing the subscriber loop if metallic by-pass pair methods are used (as well as the 28 wire DLC/PGTC control bus).

The line shelf access units 66 are connected to the various line units 64 via line unit interface buses (LUIB) 76. The LUIBs interface with a line unit controller 80 provided in each of the line units 64, the test access units 70 and the channel test unit 78. The line unit controllers (LUCs) 80 perform all the functions necessary to access the line unit interface buses 76 with the various interface or common function cards used in the line shelf. The operation of the line unit controller is more fully described in U.S. Pat. No. 4,993,019 entitled "Line Unit Interface Circuit" which is hereby incorporated by reference.

The line shelf access units 66 each include two timeslot access circuits 82 and a clock generator 84. The timeslot access circuits are connected to each line shelf processor 68 and perform most of the functions of the line shelf access units 66. The structuring and function of the timeslot access unit 82 is described in detail in U.S. patent application Ser. No. 07/451,419, now U.S. Pat. No. 5,088,089 entitled "Apparatus for Programmably Accessing and Assigning Timeslots in a Time Division Multiplexed Communication System" which is hereby incorporated by reference.

The timeslot access circuits 82 serve two significant functions: firstly, timeslot access; and secondly, timeslot assignment. The timeslot access function gives the line shelf processor direct access to data in any timeslot, which data can be monitored, extracted, replaced or inserted. This access function is a powerful tool, the benefits of which are more clearly set forth in the aforementioned application Ser. No. 07/451,419. The timeslot assignor function allows the system to allocate any one or more timeslots to a subscriber line. A group of adjacent timeslots can be assigned to a single line, thereby providing it with a wider bandwidth.

Thus, the line shelf disclosed in the above-mentioned co-pending application Ser. No. 07/452,291 is capable of supporting ninety-six DS0 level subscriber lines; however, using the timeslot assignor function, the line shelf can support higher bandwidth interfaces by combining individual DS0 channels, to the extent that twenty-four DS0 channels may be combined to provide a bandwidth of 1.5 Mb/s to service a single line.

Figure 3:
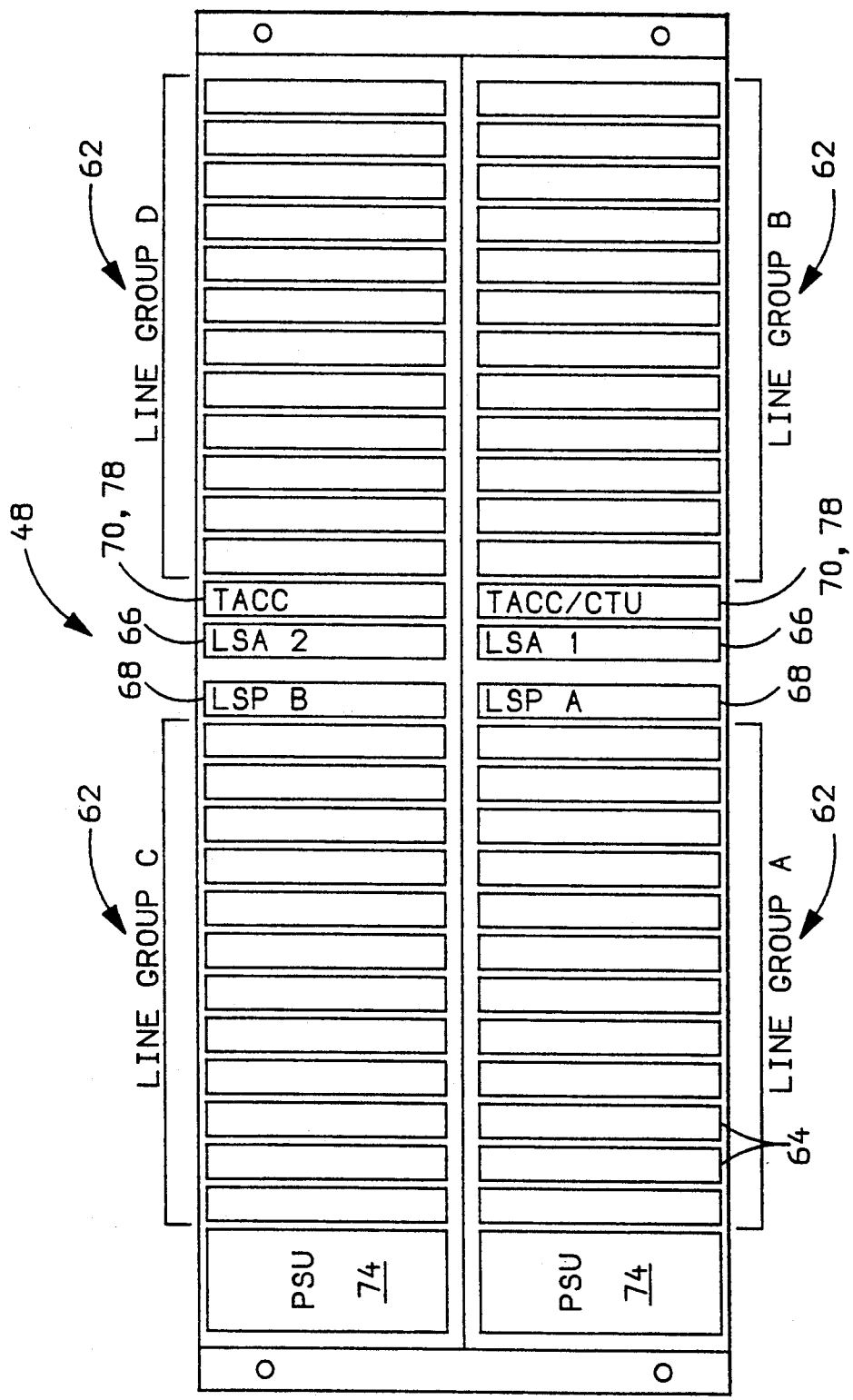
FIG. 3 is a diagram showing the structural details of a line shelf such as the line shelf shown in block diagram in FIG. 2.

The structural configuration of the line shelf 48 shown in FIG. 3 has a back plane connector array and slots for receiving various plug-in units. The line shelf includes the two redundant power supplies 74, the two line shelf processors 68, the two line shelf access units 66 and the two test access units 70 if the line shelf is to be used at remote terminal, or in lieu thereof, a channel test unit 78 if the line shelf is to be used at a central office terminal. A total of forty-eight line units 64 are shown provided in four groups of twelve each, as mentioned above.

A completely new approach from that of the above described system is described in co-pending U.S. patent application Ser. No. 07/738,315 entitled "Optical Distribution Shelf for a Remote Terminal of an Optical Fiber Telecommunication Network" which is hereby incorporated by reference. That disclosure improves on the above described system to include fiber-to-the-curb (FTC), being a new architecture built around the above described core/SBI distribution system. The method of extending fiber-to-the-curb entails extending the metallic serial bus interface (SBI) disclosed in U.S. Pat. No. 5,060,229 optically as shown in FIG. 4 from a remote terminal 100 over an optical fiber 102 to an optical network unit (ONU) 104. The details of how this SBI extension is performed is the subject of an additional patent application entitled "Optical Serial Bus Interface" under U.S. Ser. No. 07/739,603.

In systems using the access module 26 of FIG. 1, i.e., using wholly metallic interfaces between the RT and the subscriber, each RT line shelf received eight SBIs (four A side, four B side) over two cables (A side cable and B side cable). These cables come from a cross-connect core module 24 in the remote terminal and were distributed to seven line shelves via fourteen cables (28 duplicated SBIs in all).

Figure 6:
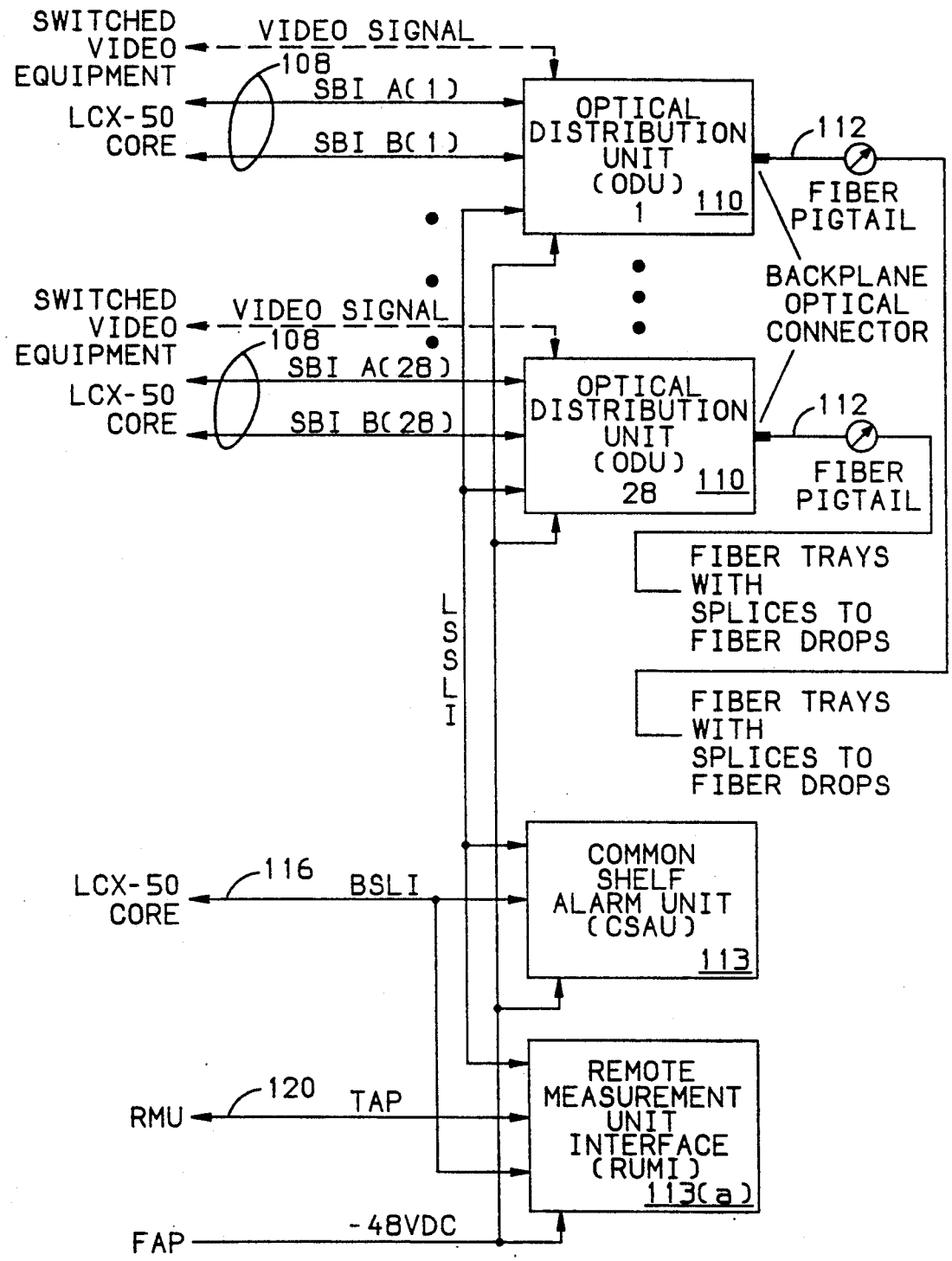
FIG. 6 is a block diagram of an optical distribution shelf as shown in FIG. 5.
Figure 5:
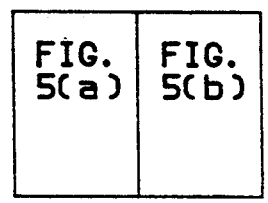
FIG 5 shows how FIGS. 5(a) and 5(b) fit together.
Figure 5A:
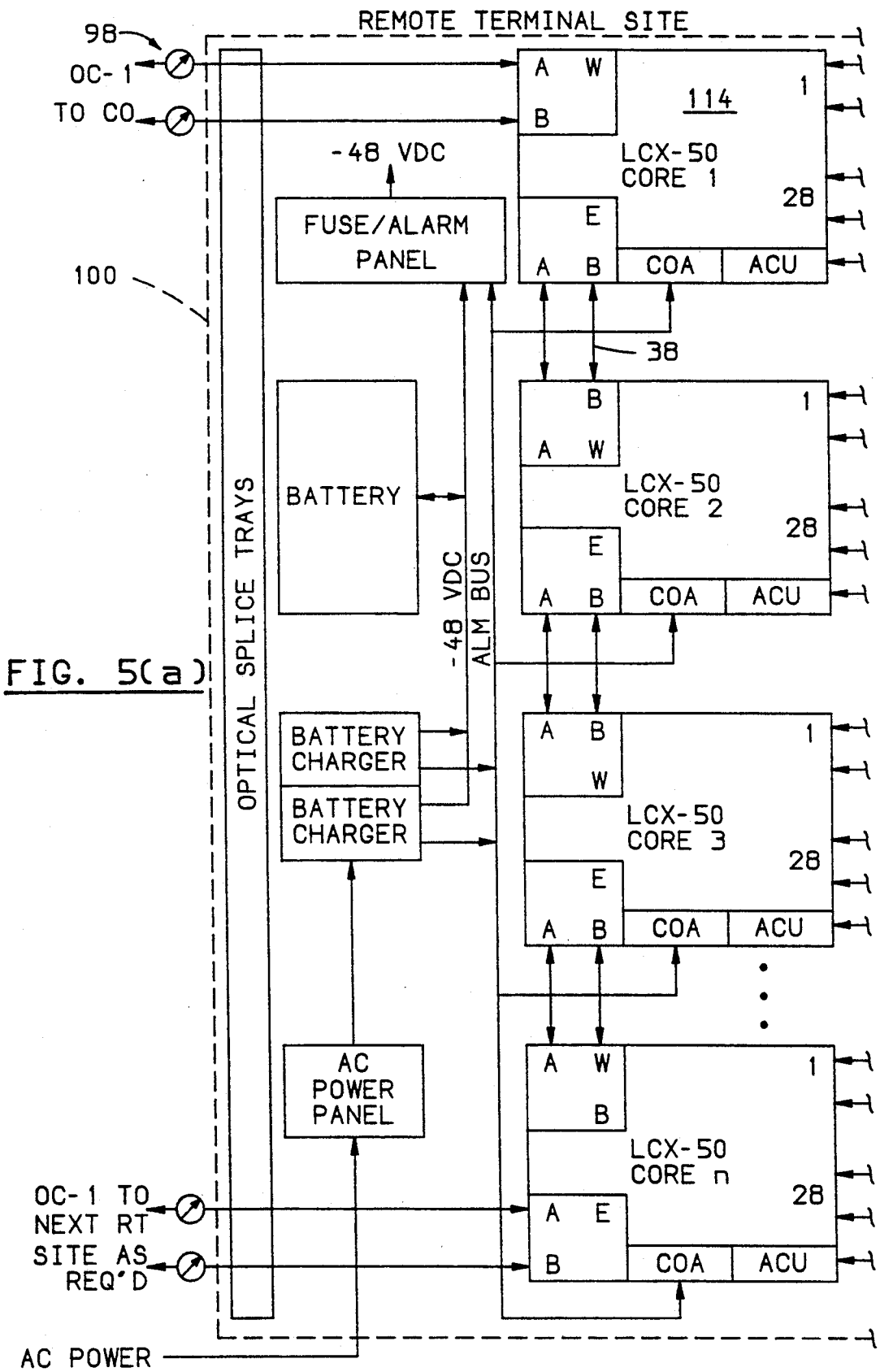
FIG. 5(a) is the left side of the block diagram of FIG. 5 showing a remote terminal equipped for narrowband service.
Figure 5B:
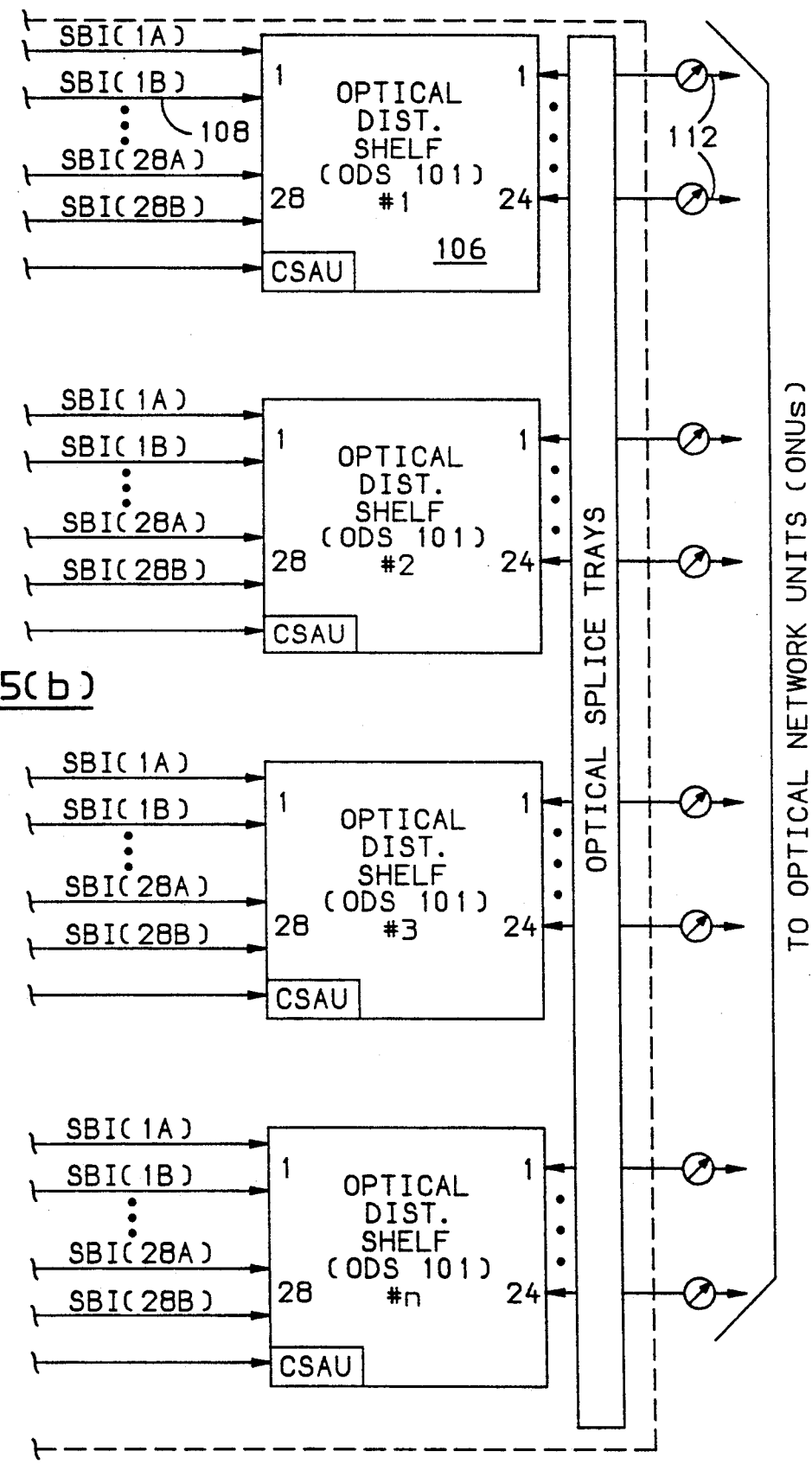
FIG. 5(b) is the right side of the block diagram of FIG. 5 showing a remote terminal equipped for narrowband service.

In the remote terminal 100 of FIG. 4, on the other hand, the fourteen SBI cables from a given core module are disclosed in the co-pending application Ser. No. 07/738,315 as being terminated on an optical distribution shelf (ODS), for example, in ODS 106, as shown in FIG. 5(b) where one set of duplicated SBIs 108 terminate at each of twenty-eight optical distribution units (ODUs) 110 in an optical distribution shelf. A group of twenty-eight ODUs in one of the ODSs of FIG. 5(b) is shown in FIG. 6. It should be realized, however, that a lesser number of ODUs could be provided, in order to reserve some slots for future use, such as a communication mechanism for control of the broadband services.

Each ODU 110 takes both A and B SBIs, selects the active one and converts it to an optical signal on an optical fiber 112 for transmission over a single fiber to an associated ONU. In addition, according to the above cited disclosure, video signals are distributed to each ODU, over a coaxial cable connection at an I/O connector, enabling the ODU to take the video signal and multiplex it onto the same fiber for transmission to the ONU 104.

Thus, each ODS of FIG. 5(b) consists of a rack of thirty card slots: twenty-eight dedicated to ODUs and one slot for a common shelf alarm unit (CSAU) 113 as shown in FIG. 6 and one slot for a remote measurement unit interface (RMUI) 113a. The CSAU unit will gather alarm/status and inventory information from all cards in the ODS and pass this information to the cross-connect core 114 via a multiprocessor serial interface bus connected in the core by means of a balanced serial link interface (BSLI) 116 shown in FIG. 6. An architecture for such a common shelf alarm unit is shown in co-pending applications Ser. No. 07/844,134 entitled "Inventory Retrieval", and Ser. No. 07/844,244, entitled "Alarm Collection Method and Apparatus".

The RMUI 113a also receives/transmits information over the BSLI 116 to the MSI bus in the core. In addition to the normal alarm/status/inventory information, the RMUI receives information telling it to place specific resistive networks across a test access path 120 shown in FIG. 6 which is similar to the test access paths 72 shown in FIG. 2. These resistive signatures are measured by the RMU in the remote terminal with the results interpreted by LMOS as specific trouble conditions detected at the ONU or ONU's line cards.

Figure 7:
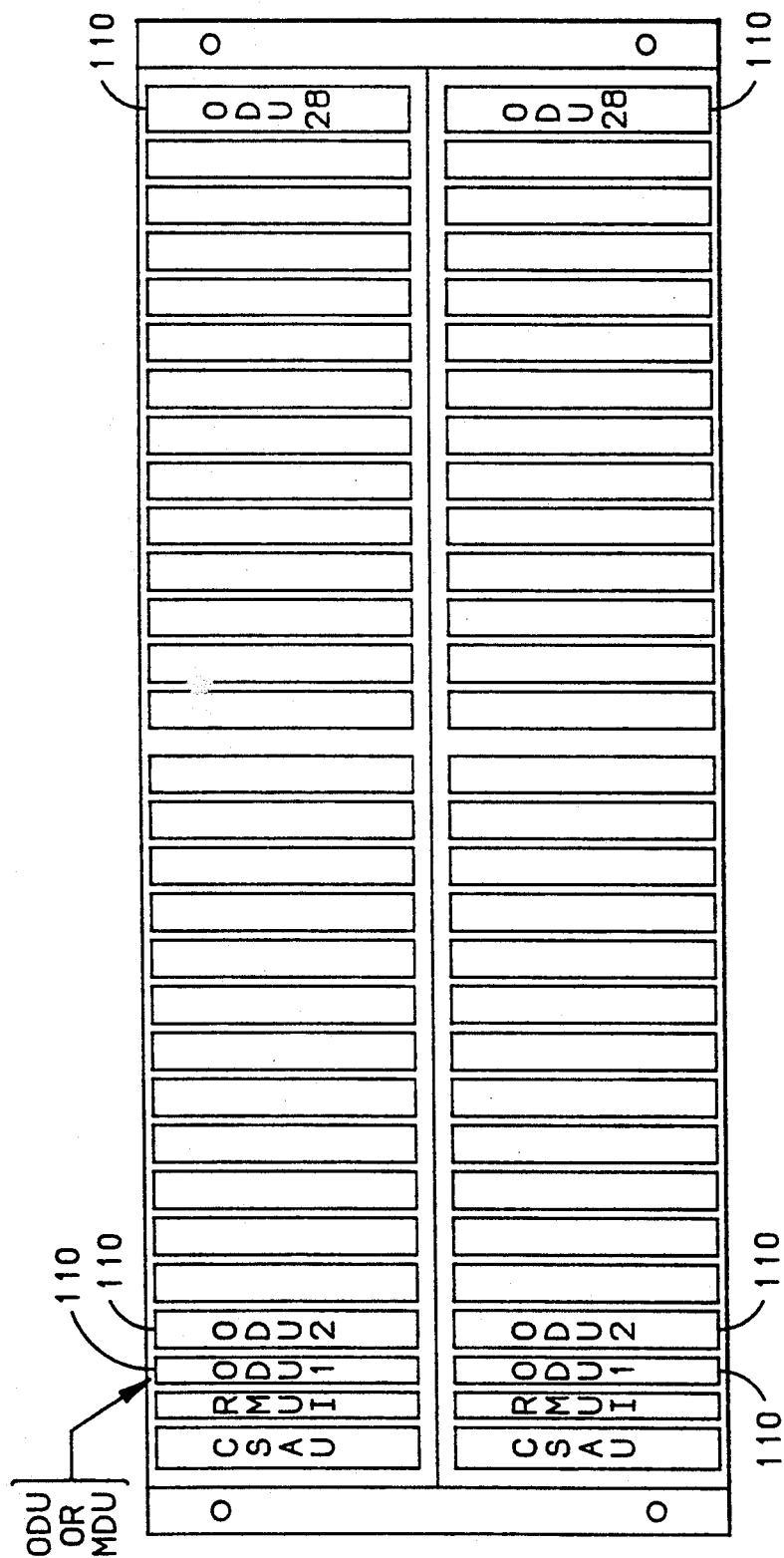
FIG. 7 is a diagram showing a structural configuration for an optical distribution shelf such as one of the optical distribution shelves shown in FIG. 5.

Each ODS of FIG. 5(b) may be the same size as a line shelf such as shown in FIG. 3 and may completely use the capacity of one cross-connect core 114. The shelves may be physically arranged as shown in FIG. 7. Just one row of twenty-eight ODUs in the shelf shown in FIG. 7 replaces up to seven metallic line shelves such as shown in FIG. 3. As mentioned, each ODS is connected to twenty-eight A and B SBIs from a cross-connect core such as shown in FIG. 5(b). Each ODS decides which of the A and B SBIs connected to it is active and utilizes the narrow band telephone signals received therefrom. Each ODS includes a plurality of optical distribution units 110 as shown in FIGS. 6 and 7 connected to the SBIs and also connected to receive the switched video signals. The ODUs frequency division multiplex the switched video signals onto the narrow band telephone signals and thereafter perform an electro-optical conversion to provide an optical output containing both broadband switched video signals and narrow band telephony signals on one optical carrier over one optical fiber. The ODS further includes a common shelf alarm unit (CSAU) and a remote measurement unit interface (RMUI), which units function as an interface to the microprocessor contained within the cross-connect core 114.

According to the teachings of the present invention, one of the ODUs in the shelf of FIG. 7 may be replaced by a metallic distribution unit (MDU). According further to the teachings of the present invention a problem found in the shelf of FIG. 7 is, with only fiber distribution in the remote housing, there is no metallic access provided at the housing. To remedy this situation, a new assembly is provided, according to the teachings of the present invention, called the metallic distribution unit 138 as shown in FIG. 8.

The architecture of the card shown in FIG. 8 includes an LSA function 140 similar to that already described in connection with FIG. 2. However, it should be realized that a scaled down version may be appropriate since it is not necessary to provide, in this context, the full DS1 complement of DS0s, nor the memory capacity to store many types of line signaling translation tables (as only POTS service is required). Thus, instead of the LUIB 142 having to interface with a large plurality of line units, only one line card function 144 is provided in the MDU role, according to the present invention. The line card function is equivalent to that described in detail in the above-cited U.S. Pat. No. 4,993,019. Similarly, the LSP function described in connection with FIG. 2 may be a scaled back version in order to handle the reduced number of DS0s.

Thus, the metallic distribution unit (MDU) of FIG. 8, according to the teachings hereof, can replace any optical distribution unit (ODU) in an optical distribution shelf (ODS) in an heretofore completely fiber remote housing The MDU is I/O compatible with the ODU, except that there will be no provision for an optical connector as in the ODUs and there is no need for a coax cable connection for video multiplexing. Generally, it may be installed in the first ODU slot of the first optical distribution shelf in the remote terminal of FIG. 5. In order to have metallic access, (at least two DS0s), the current architecture of providing two SBIs to an ODU slot is utilized. However, instead of selecting the A/B side and passing the SBI over fiber to the extent of the line shelf at the ONU (as the ODU does), the SBI will be terminated at the MDU, where a subset of the current LSP, LSA and line card functions will exist. It should be noted that an entire SBI is dedicated to this MDU function, yielding at least two DS0s (out of twenty-four available) and also allowing access to SBI overhead channels (i.e. VI channel for LSP to DNC communications). In addition to the SBI to DS0 conversion for metallic access, the card will provide alarm/status and inventory information per the ODS/CSAU scheme proposed in the above cited U.S. patent applications Ser. No. 07/844,134, filed Mar. 2, 1992 and Ser. No. 07/844,244, filed Mar. 2, 1992. These metallic access paths can be used for several purposes. DS0s must be provided for (1) the analog modem link to the remote test or remote measurement unit residing in the remote housing, and (2) an order wire function at the remote housing. The order wire gives a tip/ring access at the fuse/alarm panel of the remote terminal of FIG. 5(a) allowing a craft person to place telephone calls with his "butt set", providing normal telephone operation from a dedicated telephone number. These two functions are required at the Remote Terminal, yet without the MDU of the present invention, provision for these services would only be available by adding a metallic line shelf, LSAs, LSPs, PSUs and a line card—at great expense in time, money and wasted space at the RT. Any DS0s going outside the RT housing will have their tips/rings protected against lightning/power cross and, if provided, can permit normal customer drops for telephony service to a subscriber within a CSA area.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Apparatus, comprising:
    an optical distribution shelf having a plurality of optical distribution units each responsive to one of a plurality of metallic serial bus interface (SBI) signals for providing same as optical serial bus interface signals; and
    a metallic distribution unit for insertion in the optical distribution shelf, responsive to one of the plurality of metallic (SBI) signals, for providing at least one metallic subscriber level signal.

2. The apparatus of claim 1, wherein the metallic distribution unit comprises:
    a metallic line shelf access, responsive to the one of the plurality of metallic SBI signals and responsive to a control signal, for providing selected voice channel signals; and
    a metallic line shelf processor, responsive to the one metallic SBI signal for providing, the control signal 3. The apparatus of claim 2, further comprising means responsive to the selected voice channel signals for providing same as separate metallic signals.

* * * * *